J. KREJCI.
SHOCK ABSORBER.
APPLICATION FILED MAR. 27, 1908.

913,392.

Patented Feb. 23, 1909.
2 SHEETS—SHEET 1.

Witnesses:
Wm. P. Bond
Pierson W. Banning

Inventor:
Joseph Krejci
by Banning & Banning
Attys.

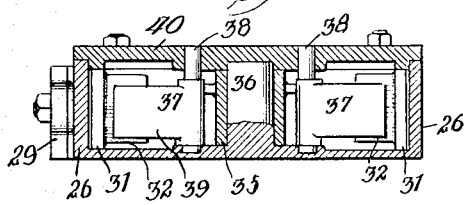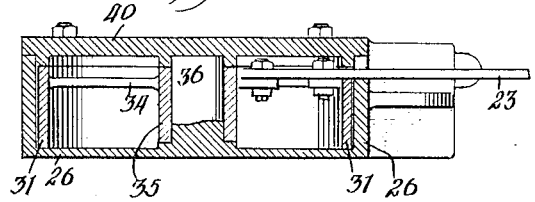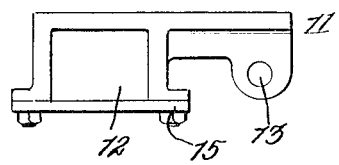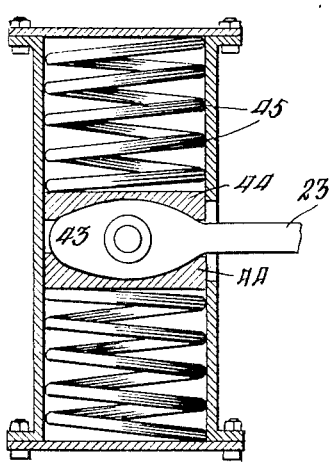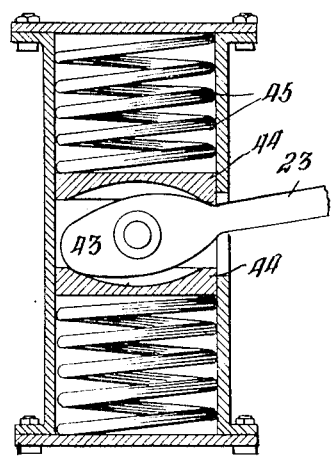

UNITED STATES PATENT OFFICE.

JOSEPH KREJCI, OF CHICAGO, ILLINOIS.

SHOCK-ABSORBER.

No. 913,392.　　　　Specification of Letters Patent.　　　　Patented Feb. 23, 1909.

Application filed March 27, 1908.　Serial No. 423,699.

*To all whom it may concern:*

Be it known that I, JOSEPH KREJCI, a citizen of the United States, residing at Chicago, in the county of Cook and State of Illinois, have invented certain new and useful Improvements in Shock-Absorbers, of which the following is a specification.

This invention is intended, primarily, to be used with automobiles, although the device may be applied to carriages or other vehicles in which it is desirable to make use of a shock absorber for the purpose of minimizing the effect of jars or jolts on the vehicle body.

The essential object of my device is to construct an improved shock absorber which, when used in connection with vehicle bodies, will tend to minimize, in a large measure, the shocks and jars incident to continuous use and travel.

The invention consists in the features of construction and combination of parts hereinafter described and claimed.

Figure 1:
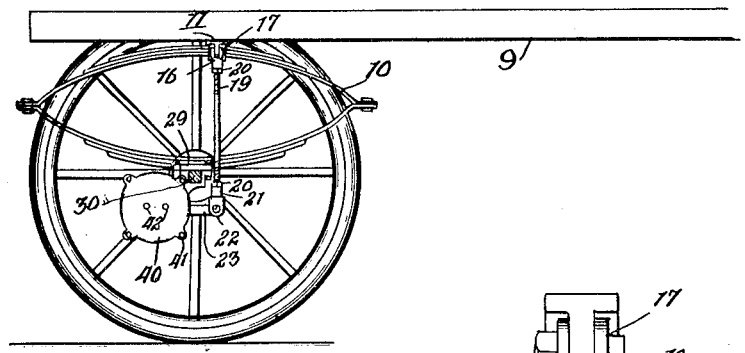
Figure 2:
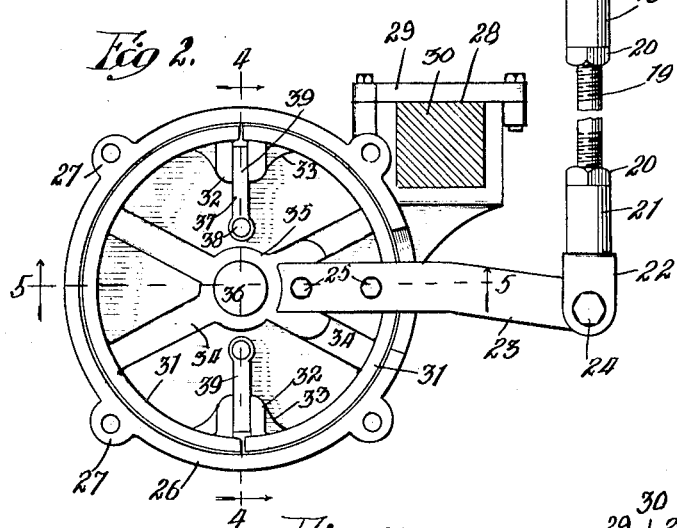
Figure 3:
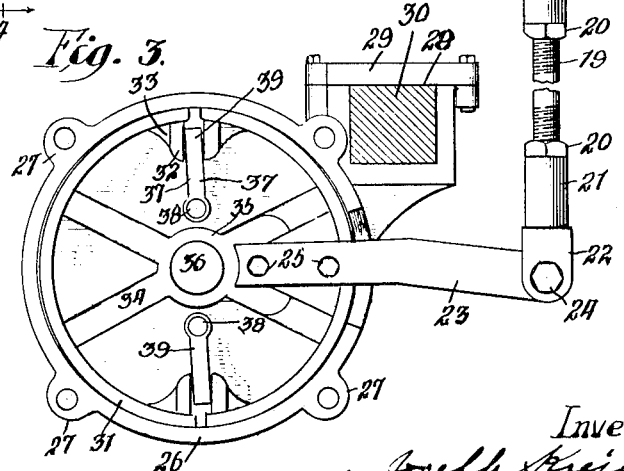

In the drawings, Figure 1 is a side elevation of the device as used in connection with a vehicle body; Fig. 2 an enlarged side elevation of the device, with the cover removed; Fig. 3 a similar view to Fig. 2 of the device, when subjected to the action of jars or jolts; Fig. 4 a transverse section, taken on line 4—4 of Fig. 2, looking in the direction of the arrow; Fig. 5 a transverse section, taken on line 5—5 of Fig. 2, looking in the direction of the arrow; Fig. 6 a side elevation of the retainer, which is attached to the vehicle spring; Fig. 7 a longitudinal section, illustrating a slightly modified form of construction; and Fig. 8 a similar view to Fig. 7, the lever being acted upon.

This improved shock absorber, as illustrated in Fig. 1, is adapted to be used in connection with a vehicle body 9 having spring 10 of the usual type, upon the upper arched bar of which is mounted a retainer 11 having formed therein a rectangular opening 12 as well as a round opening 13 in its forward end. This retainer can be fixedly positioned upon the vehicle spring by means of a lower removable cross piece 15.

A hanging member 16 is adapted to have its upper forked end 17 inserted over the end portion of the retainer so that the opening 13 therein will register with the openings in the forked ends 17, through which a bolt 18 is inserted, locking the parts together. To the lower end of the hanging member 16 is secured an adjustable link 19 which has its threaded ends positively retained by upper and lower lock nuts 20, the lower end thereof being secured within a lower hanging member 21 having a lower forked end 22 of the same construction as that hitherto described. The outer end of a lever 23 is locked within the forked end 22 by means of a bolt 24. The inner end of the lever 23 is fixedly secured to the shock absorbing mechanism by means of bolts 25. This mechanism is inclosed within a suitable casing 26 having lugs 27 with openings therethrough formed upon the periphery thereof, as shown. Positioned above the lever 23 and usually formed integrally with the casing 26 is a projection having a squared opening 28 having a removable cap or cover 29, adapted to receive a vehicle axle 30.

Within and about the inner periphery of this casing 26 is a split ring 31 comprising two independent peripheral sections, and, as shown, companion inturned lugs 32 are formed integral with and at the end of said sections, the lugs being braced and strengthened by ribs 33. A plurality of diverging spokes 34 are formed integral with the split ring sections, the same merging together in a central hub 35 which is mounted upon and over a stub shaft 36 integrally and centrally positioned upon the interior of the casing 26. Formed diametrically opposite one another within the bottom of the casing 26 and at right angle relation to the lever 23 are recesses adapted to retain therein winged locking pins 37 having rounded ends 38 and projecting wings 39, the outer ends of which normally lie within the companion lugs 32.

The mechanism within the casing 26 is protected by a cap or cover 40 having a plurality of lugs 41 with holes therethrough adapted to register with the lugs 27 upon the casing and be locked therein by means of bolts or otherwise. The inner side of the cover 40 has an end bearing formed centrally therein; and on opposite side thereof are drilled openings 42 adapted to retain therein the upper rounded ends 38 of the locking pins 37.

In Figs. 7 and 8 is illustrated a slightly modified construction of shock absorber. The lever 23, as shown, has its inner end 43 of elongated eccentric formation. Contacting the upper and lower sides of this eccentrically formed end are companion cross pieces 44 having their inner sides, as indicated, conforming to the general curvature of the eccentrically formed end. Upon the outer sides of these companion cross pieces 44 are helically coiled springs 45 normally retaining the lever 23 in the position indicated in Fig. 7, the cross pieces 44 acting upon the lever.

In use the shock absorber may be positioned, as indicated in Fig. 1. When jars or jolts are imparted to the vehicle axle by reason of rough or bad roads, the lever 23, in connection with the vehicle spring 10, causes the resultant shock to be minimized and absorbed by reason of the lever mechanism acting upon the split rings 31. The locking pins 37, as indicated, have their outer ends within the lugs 32, and when shock is imparted to the mechanism it causes these lugs to act upon the pins 37 to distend the ends of the split rings 31, thus causing a spring action.

What I claim as new and desire to secure by Letters Patent is:

1. A shock absorber comprising an outer casing and means for retaining the same adjacent a vehicle axle, a split ring within the casing having inwardly projecting lugs thereon and radiating spokes merging into a hub, a stub shaft adapted to engage the hub, locking pins having their outer ends between the lugs, and mechanism connecting the split ring with the vehicle spring, substantially as described.

2. A shock absorber comprising an outer casing having a stub shaft centrally formed therein and means for retaining the casing adjacent a vehicle axle, a split ring within the casing having inwardly projecting lugs thereon and radiating spokes merging in a hub, locking pins having their outer ends retained between the lugs, and mechanism connecting the split ring with a vehicle spring, substantially as described.

3. A shock absorber comprising an outer casing having a stub shaft centrally formed therein and means for retaining the casing adjacent a vehicle axle, a split ring within the casing having inwardly projecting lugs thereon and radiating spokes merging in a hub, locking pins having their outer ends retained between the lugs, a cover for the casing having a central end bearing and openings drilled on opposite sides thereof adapted to retain the inner ends of the locking pins, and mechanism connecting the split ring with a vehicle spring, substantially as described.

4. A shock absorber comprising an outer casing having a stub shaft centrally formed therein and means for retaining the casing adjacent a vehicle axle, a split ring within the casing having inwardly projecting lugs thereon, locking pins having their outer ends between the lugs, a cover for the casing having a central end bearing and openings on both sides thereof adapted to retain the inner ends of the locking pins, and mechanism connecting the split ring with a vehicle spring, substantially as described.

JOSEPH KREJCI.

Witnesses:
P. Y. NIX,
WALKER BANNING.